US011909646B2

(12) United States Patent
Rutkowski et al.

(10) Patent No.: US 11,909,646 B2
(45) Date of Patent: Feb. 20, 2024

(54) CONTROLLING NETWORK THROUGHPUT USING APPLICATION-LEVEL THROTTLING

(71) Applicant: Microsoft Technology Licensing, LLC, Redmond, WA (US)

(72) Inventors: Bradley David Rutkowski, Woodinville, WA (US); Todd Carlyle Luttinen, Redmond, WA (US); Sachin Ramakanth Kulkarni, Bothell, WA (US); Vijay Rajesh Kumar, Bothell, WA (US); Joseph Ryan Warren, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/847,416

(22) Filed: Jun. 23, 2022

(65) Prior Publication Data
US 2023/0421503 A1  Dec. 28, 2023

(51) Int. Cl.
*H04L 12/26* (2006.01)
*H04L 12/801* (2013.01)
*H04L 12/803* (2013.01)
*H04L 47/122* (2022.01)
*H04L 43/16* (2022.01)
*H04L 43/0882* (2022.01)
*H04L 47/11* (2022.01)

(52) U.S. Cl.
CPC ........ *H04L 47/122* (2013.01); *H04L 43/0882* (2013.01); *H04L 43/16* (2013.01); *H04L 47/11* (2013.01)

(58) Field of Classification Search
CPC ............... H04L 43/04; H04L 43/08; H04L 43/0876–091; H04L 43/16; H04L 47/10–12; H04L 47/70
See application file for complete search history.

(56) References Cited

U.S. PATENT DOCUMENTS

| 7,630,314 | B2* | 12/2009 | Dos Remedios | ..... H04L 47/263 370/464 |
| 9,137,620 | B1* | 9/2015 | Mirza | ...................... G06F 21/57 |
| 10,574,554 | B2* | 2/2020 | Lehner | .................... H04L 43/16 |

(Continued)

OTHER PUBLICATIONS

"Differentiated services", Retrieved from: https://en.wikipedia.org/wiki/Differentiated_services, Jun. 3, 2022, 7 Pages.

(Continued)

*Primary Examiner* — Boris D Grijalva Lobos
(74) *Attorney, Agent, or Firm* — Christopher J. Volkmann; Kelly, Holt & Christenson, PLLC

(57) ABSTRACT

A congested network link is identified. Applications that are contributing to the congestion are also identified. The contribution of each of the identified applications to the congestion is then determined in order to determine whether the application's usage of the network should be throttled. A control signal is generated in order to indicate to the application that it is to perform an application-specific throttling operation to reduce the network bandwidth consumed by the application. If the application-specific throttling does not sufficiently reduce network congestion, a more aggressive throttling operation is performed.

20 Claims, 5 Drawing Sheets

(56) References Cited

U.S. PATENT DOCUMENTS

| | | | |
|---|---|---|---|
| 11,146,624 B2* | 10/2021 | Kona | H04L 67/568 |
| 2005/0083973 A1 | 4/2005 | Krishnan | |
| 2012/0008494 A1* | 1/2012 | Laoutaris | H04L 41/0896 |
| | | | 370/230 |
| 2016/0088049 A1* | 3/2016 | Seed | H04W 4/70 |
| | | | 709/203 |
| 2017/0078922 A1* | 3/2017 | Raleigh | H04L 69/18 |
| 2017/0302553 A1 | 10/2017 | Zafer et al. | |
| 2017/0353886 A1* | 12/2017 | Agarwal | H04L 43/026 |
| 2018/0062944 A1* | 3/2018 | Altman | H04L 67/1008 |
| 2018/0212845 A1* | 7/2018 | Eriksson | H04L 47/70 |
| 2019/0394672 A1* | 12/2019 | Mukherjee | H04W 28/086 |
| 2021/0099740 A1* | 4/2021 | Hale | H04N 21/2385 |
| 2021/0117334 A1* | 4/2021 | Guim Bernat | G06F 12/0882 |
| 2021/0136163 A1* | 5/2021 | McCormick | H04L 67/146 |
| 2021/0392548 A1* | 12/2021 | Mallikarjunan | H04W 28/0257 |
| 2023/0016288 A1* | 1/2023 | Chauvin | H04W 28/0278 |
| 2023/0130774 A1* | 4/2023 | Boyapalle | H04W 24/10 |
| | | | 370/235 |
| 2023/0185617 A1* | 6/2023 | Moghaizel | G06F 11/3495 |
| | | | 718/104 |

OTHER PUBLICATIONS

"International Search Report and Written Opinion Issued in PCT Application No. PCT/US23/021823", dated Jul. 20, 2023, 14 Pages.

\* cited by examiner

CONTROLLING NETWORK THROUGHPUT USING APPLICATION-LEVEL THROTTLING

BACKGROUND

Computer systems are currently in wide use. Some computer systems are cloud-based systems or other remote server systems that host applications and services for tenant organizations. The tenant organizations often connect through a wide area network (e.g., the internet) to the remote server computing systems that host applications. The tenant organizations also often use an Internet Service Provider (ISP) to gain access to the wide area network. In some cloud service architectures, the cloud providers (or remote sever computing systems) use large amounts of network bandwidth with many thousands of ISP networks.

Network congestion events can occur due to unforeseen circumstances. The network congestion events can cause an undesirable amount of congestion on certain network links in the networks used by the cloud providers. Such events can occur for any number of reasons. For instance, some congestion events can occur due to network failure, fiber optic communication links being cut, network peering changes, and for other reasons.

When such events occur, the network capacity (or bandwidth capacity of the network links) can become saturated. In one example, saturation will be referred to herein as a condition in which the network is so congested by network traffic that users experience a degradation in service, in terms of increased latency or other degradation. In one example, saturation can be measured as a percent of maximum bandwidth capacity that is being carried by a network link. The result of this network saturation is that applications continue to attempt to use the network based on its original capacity, without regard to the network being saturated. This results in a poor user experience.

Some current systems thus attempt to throttle network usage when the network becomes saturated. For instance, when the system detects congestion on network links between a cloud service provider and a particular data center of a client, the system attempts to throttle all client systems using that data center. In another example, such systems attempt to throttle all traffic in a particular geographic location where the congestion is occurring.

The discussion above is merely provided for general background information and is not intended to be used as an aid in determining the scope of the claimed subject matter.

SUMMARY

A congested network link is identified. Applications that are contributing to the congestion are also identified. The contribution of each of the identified applications to the congestion is then determined in order to determine whether the application's usage of the network should be throttled. A control signal is generated in order to indicate to the application that it is to perform an application-specific throttling operation to reduce the network bandwidth consumed by the application. If the application-specific throttling does not sufficiently reduce network congestion, a more aggressive throttling operation is performed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, network saturation events can occur unexpectedly. One current approach to handling this is to perform general, large-scale throttling. The present discussion thus proceeds with respect to a system in which the congested network links are identified and then an application contributing to that congestion is also identified. If the application is contributing a sufficient amount to the congestion, then a control signal is sent to that application indicating that the application is to throttle its usage. In one example, the application can insert in message headers an indication that the acceptable buffer sizes of information corresponding to particular requests is limited to a smaller size. The reduction in buffer size requires clients to send smaller buffers of information with each request, in order to reduce bandwidth. Such buffers are often used in bulk operations, such as in synchronizing mailboxes when a user logs on, and other such operations. In another example, additional features can be identified for the application to throttle. For instance, it may be that the application is instructed to reduce the resolution of conference calls, video calls, etc., in order to free up more bandwidth. These and other control signals can be generated.

Figure 1:
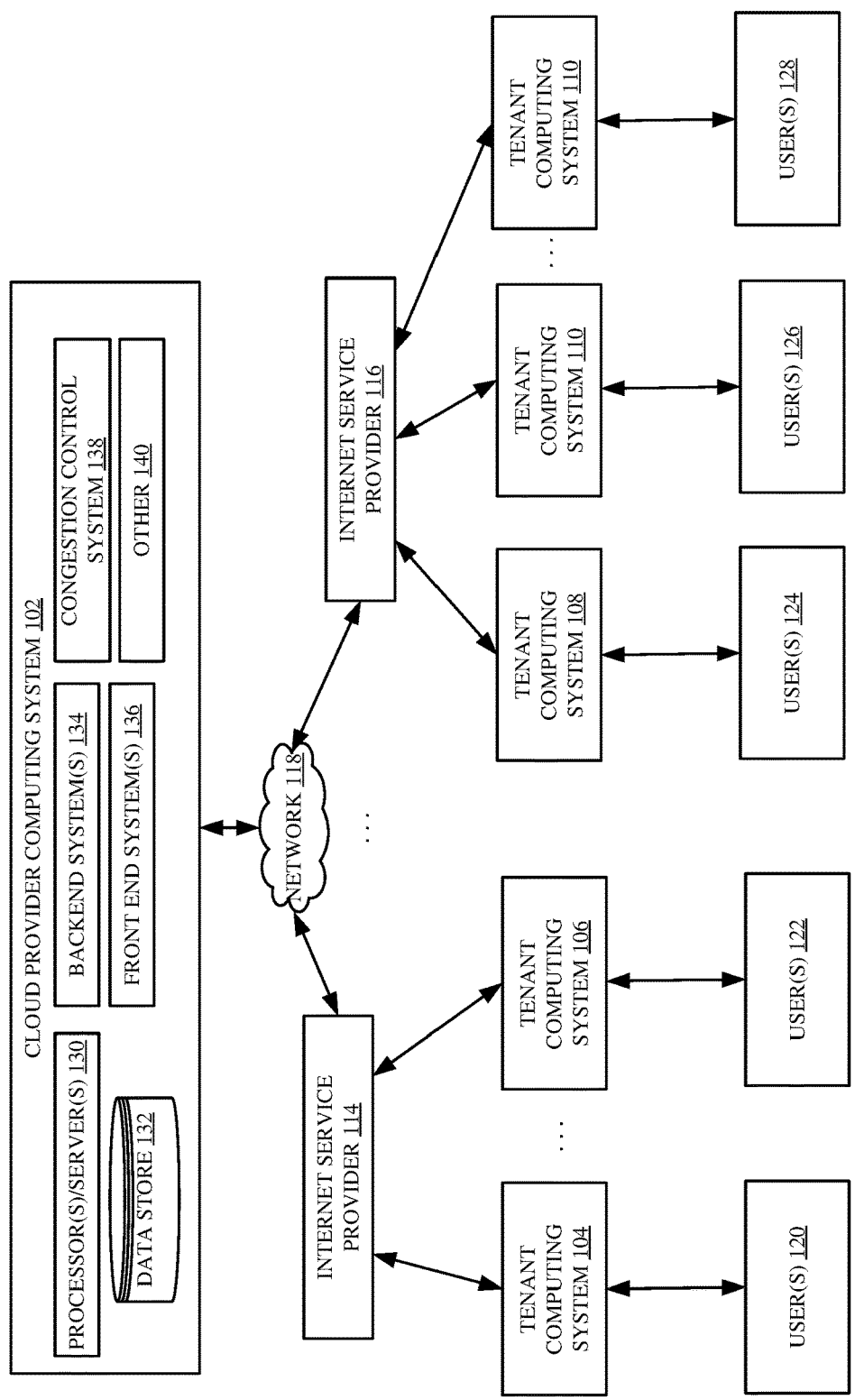
FIG. 1 is a block diagram of one example of a computing system architecture.

FIG. 1 is a block diagram of one example of a computing system architecture 100 in which a cloud provider computing system 102 hosts one or more applications for access by a plurality of tenant computing system 104, 106, 108, 110, and 112 through a plurality of different Internet Service Providers (ISPs) 114-116, over network 118. Each of the tenant computing systems may have one or more users which can communicate with the tenant computing systems through user devices. The user devices may be mobile devices, desktop computers, laptop computers, tablets, or other computing systems. In the example shown in FIG. 1, users 120 use tenant computing system 104. Users 122 use tenant computing system 106. Users 124 use tenant computing system 108. Users 126 use tenant computing system 110, and users 128 use tenant computing system 112. While the users 120-128 are not shown using user devices, those devices may be used in architecture 100. The users interact with interfaces exposed by the corresponding tenant computing systems and/or user devices in order to control and manipulate portions of the tenant computing systems and hosted applications.

Each tenant computing system may have one or more processors or servers that allow the corresponding users to access applications and services hosted by cloud provider computing system 102. In order to access those applications and servers, the tenant computing systems provide requests, and receive responses, through ISPs 114-116. The ISPs 114-116 interact with cloud provider computing system 102 through network 118. Network 118 may thus include a wide area network (such as the Internet), a local area network, a near field communication network, a cellular communication network, or any of a wide variety of other networks or combinations of networks.

Cloud provider computing system 102, as shown in FIG. 1, includes one or more processors or servers 130, data store 132, backend systems 134, frontend systems 136, congestion control system 136, and other items 140. Frontend systems 136 expose one or more interfaces to the applications or services hosted by cloud provider computing system 102. Those interfaces may be accessed by tenant computing systems 104-112 through their corresponding ISPs 114-116 over network 118. The requests received through the exposed interfaces are provided from frontend systems 136 to backend systems 134 which modify tenant and/or client data stored in data store 132 or perform other operations. The backend systems 134 then return results of the request to the requesting tenant computing system through the interfaces exposed by frontend systems 136.

Congestion control system 138 monitors the network traffic over the link in network 118 and determines whether congestion is occurring. Congestion may be occurring on some of the network links between ISPs 114-116 and frontend system 136 even though congestion is not occurring on other links. Therefore, congestion control system 138 identifies the particular links that are congested or saturated. Congestion or saturation may be indicated, for instance, when the network link is at a threshold percentage of its maximum bandwidth capacity (e.g., 85% or another percent of its maximum bandwidth capacity). The particular links that are congested or saturated can be identified using subnet internet protocol (IP) addresses of the ISPs 114-116, using the peering information that defines how ISPs are peered relative to one another to cooperate to allow tenants to access the internet, and tenant information defining the architecture of each tenant computing system (such as the addresses of the data centers that the tenants use, the addresses of the subnetworks that the tenants use, etc.).

Then, for each congested network link, congestion control system 138 identifies which applications are contributing to the congestion, such as which applications are using that congested link. The applications can be identified based upon the IP ranges from which the requests originate, based upon the ports that are being used, etc. The amount of the congestion attributed to each application is also identified so that the particular applications that are causing most of the congestion can be identified as high usage applications. For instance, the percent of the total traffic on the congested link that is attributable to a particular application may be a factor in determining whether that application is selected for throttling. Congestion control system 138 then generates a control signal and provides the control signal to the high usage applications indicating that the high usage applications are to take throttling actions.

Further, system 138 can identify the particular throttling steps that are to be taken and also other features of the application that should be modified in order to reduce the network bandwidth consumed by that application. By way of example, some applications use buffers in order to perform bulk operations. For instance, email applications may use buffers to transfer information when synchronizing mailboxes (such as when a user logs on). System 138 may identify the throttling operation as an operation to reduce the size of the buffers that are used to perform synchronization or other bulk operations, thus reducing network bandwidth consumed by the email application. The system 138 can also generate the control signal identifying other features of an application to modify in order to perform throttling. For instance, the control signal may indicate that the resolution of video or teleconference calls is to be reduced. Though this would sacrifice some quality in the audio or visual calls, it reduces network bandwidth consumption.

In one example, congestion control system 138 can continue to monitor the level of traffic on the congested links and if the congestion is not sufficiently reduced, then a control signal can be generated indicating more aggressive throttling steps that are to be taken by the applications that are contributing most to the congestion.

Figure 2:
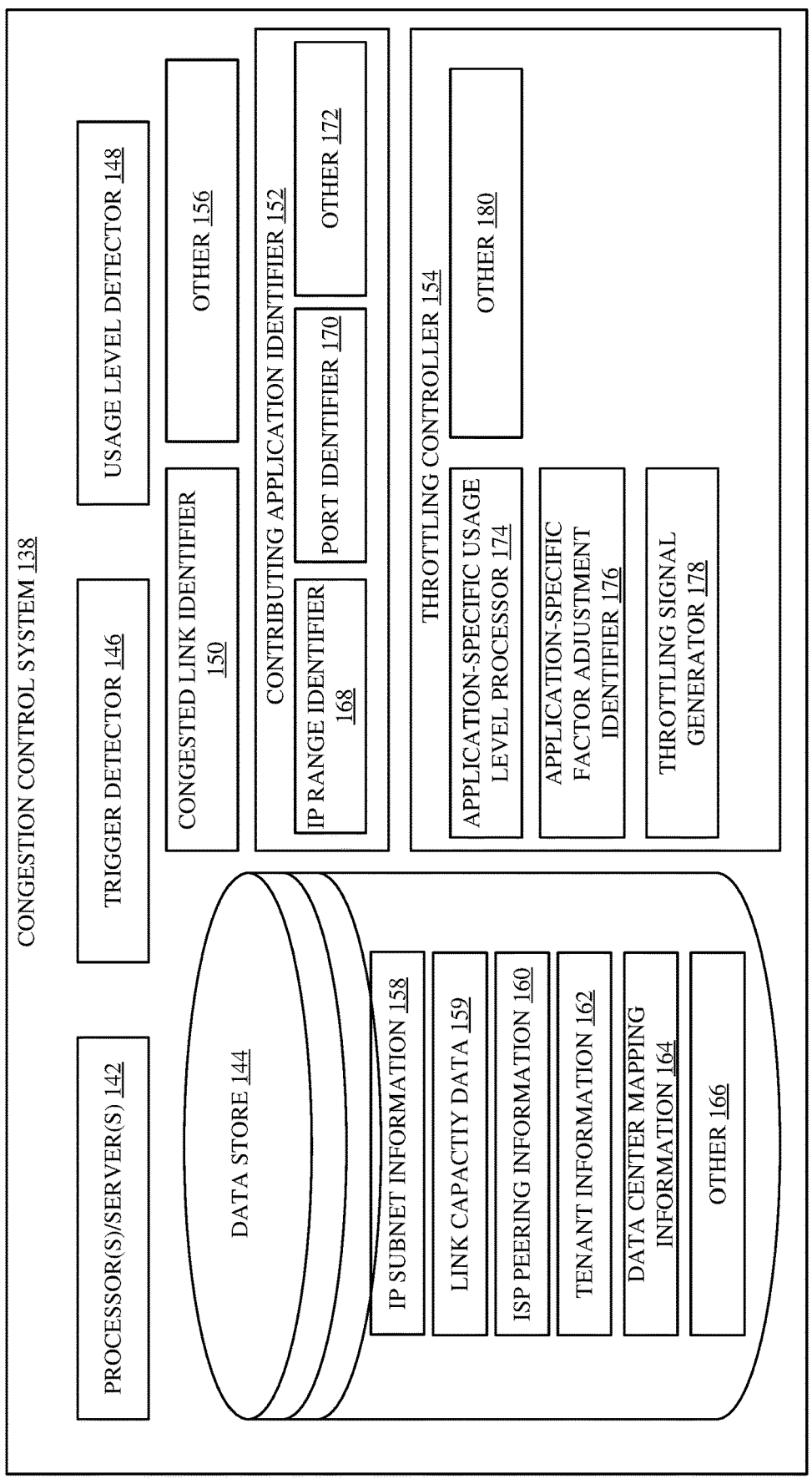
FIG. 2 is a block diagram showing one example of a congestion control system.

FIG. 2 is a block diagram showing one example of congestion control system 138 in more detail. It will be noted that congestion control system 138 can be implemented by the processes or servers 130 of the applications themselves, or in other locations in architecture 100. System 138 is shown as a separate system 138 in cloud provider computing system 102 for the sake of example only.

In the example shown in FIG. 2, congestion control system 138 includes one or more processors or servers 142, data store 144, trigger detector 146, usage level detector 148, congested link identifier 150, contributing application identifier 152, throttling controller 154, and other items 156. Data store 144 can include IP subnet information 158, link capacity data 159, ISP peering information 160, tenant information 162, data center mapping information 164, and other information 166. Contributing application identifier 152 can include IP range identifier 168, port identifier 170, and other items 172. Throttling controller 154 can include application-specific usage level processor 174, application-specific factor adjustment identifier 176, throttling signal generator 178, and other items 180. IP subnet information 158 can identify the different IP subnet addresses used by the different components and systems in architecture 100. For instance, the IP addresses may identify the links between the ISPs 114-116 and a cloud provider computing system 102. ISP peering information 160 can identify how ISPs 114-116 peer with one another, or cooperate with one another, in order to provide Internet access for the different tenant computing systems 104-112 that use them. Tenant information 162 can identify the links that are used between the different tenants and their corresponding Internet service providers, the applications that the different tenants are using, and other information. Data center mapping information 164 can identify the different tenants that are using different data centers, and other information.

Trigger detector 146 illustratively detects a trigger indicating that congestion control system 138 is to examine the network congestion to determine whether throttling actions should be taken. The trigger detector 146 can use a time-based trigger so that congestion control system 138 polls the congestion level intermittently or periodically based on elapsed time. Trigger detector 146 can also use a traffic level-based trigger so that congestion control system 138 identifies the congestion based on when the level of traffic has increased beyond a threshold amount. Trigger detector 146 can detect other trigger criteria as well.

Usage level detector 148 then identifies the bandwidth that is being used on the various links in the network, relative to the overall capacity that can be served by those links, to identify congested links. Detector 148 can identify the number and size of requests and responses carried by a link over time to identify the usage level or bandwidth being consumed. The usage level or bandwidth can be identified in other ways as well. Where the traffic level on a particular link or set of links exceeds a threshold amount of its overall capacity (such as 85% of its overall bandwidth capacity) then this may indicate that the link is approaching saturation or is congested. IP range identifier 168 can identify the contributing applications (those applications using the congested link) based upon the IP address range that is being used in the requests. Port identifier 170 can identify the contributing applications by identifying the ports that the requests are using.

Throttling controller 154 then determines which applications are to be throttled based upon the contribution of the applications to the congestion on the congested link. Application-specific usage level processor 174 identifies the contribution of each application that is using the congested link to the network traffic. For instance, assuming that the congested link is at 85% of its capacity, then application-specific usage level processor 174 can identify the amount of the 85% that is attributable to each application using that link. If an application is contributing a threshold amount to the congestion, then that application can be identified as a high usage application (e.g., an application where throttling is to be performed). In this way, applications that are not significantly contributing to the congestion will not be throttled. However, applications that are significantly contributing to the congestion will be throttled in order to reduce congestion and improve user experience.

Application-specific factor adjustment identifier 176 may identify application-specific throttling actions to take and other application-specific factors that are to be adjusted. By way of example, it may be that the resolution settings for a meeting application, that users use to conduct video or audio meetings, is to reduce the resolution settings for such meetings. This will reduce the bandwidth requirements for machine audio or video calls. In another example, the applications may be instructed to adjust the settings for operations taking place in the background of an application (such as synchronizing mailboxes, updating information, etc.) to reduce the size of bulk data transfers that the application can make. This may increase the time that it takes to perform the background operations, but it will also reduce the network bandwidth being consumed by the application.

Throttling signal generator 178 generates a control signal and provides the signal, to the identified applications. The control signal may indicate that the application(s) are to take throttling steps. In one example, the control signal may identify the particular application-specific throttling steps that each application is to take. The throttling steps are thus application-specific operations or steps that are not only specific to the applications that are causing most of the congestion, but they are also operations or steps that are specific to the functionality of each application (e.g., reducing buffer size, reducing resolution, etc.).

In one example, congestion control system 138 can continue to monitor the bandwidth usage on the congested links to see whether the throttling steps have reduced congestion sufficiently (such as by a predetermined percentage or other amount). If not, then throttling signal generator 178 can generate a control signal indicating that a more aggressive throttling approach needs to be taken. In one example, the control signal also identifies the more aggressive throttling operations that the application is to perform. Further, the more aggressive throttling operations may be extended to other applications that were not initially controlled to throttle network usage. These are just examples of the more aggressive steps that can be taken in order to further reduce network congestion on the congested links.

Figure 3A:
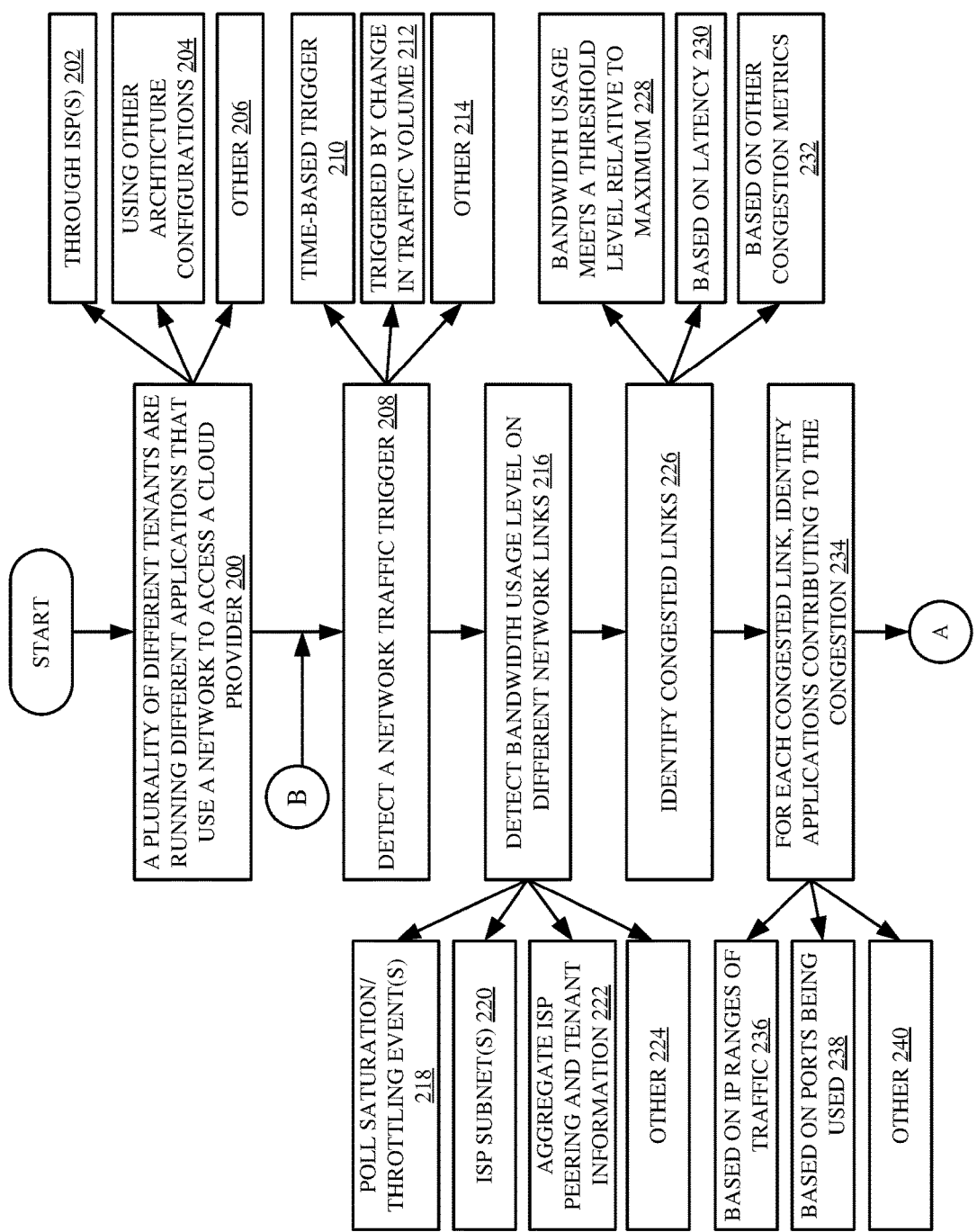
FIGS. 3A and 3B (collectively referred to herein as FIG. 3) show a flow diagram illustrating one example of the operation of the congestion control system.
Figure 3B:
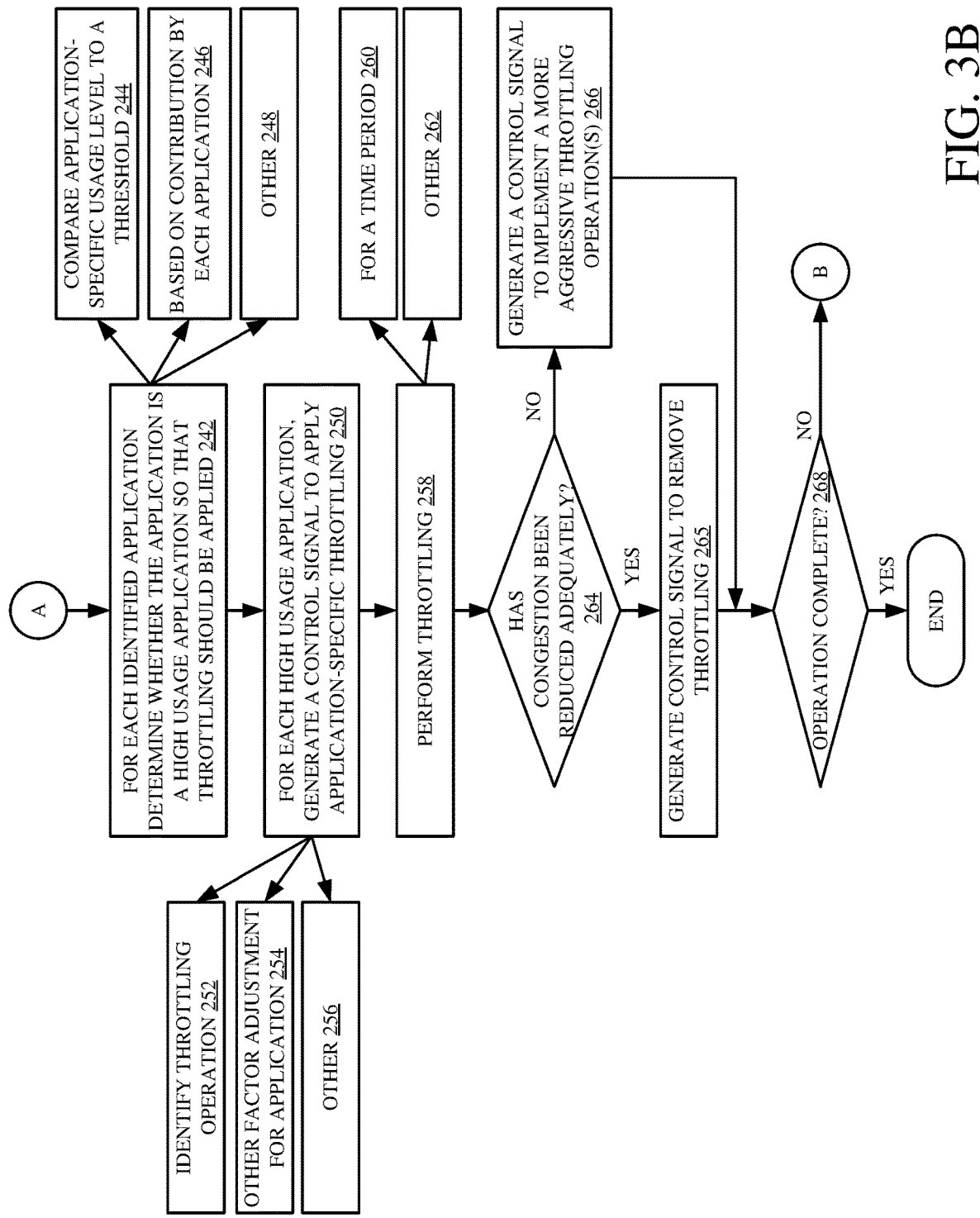

FIGS. 3A and 3B (collectively referred to herein as FIG. 3) show a flow diagram illustrating one example of the operation of the computing system architecture 100 shown in FIG. 1, and of the congestion control system 138 shown in more detail in FIG. 2. It is first assumed that a plurality of different tenants are running different applications that use a network to access applications hosted by a cloud provider computing system, as indicated by block 200 in the flow diagram shown in FIG. 3. One example of such a computing system architecture is described above with respect to FIG. 1 in which different tenants 104-112 are running or accessing applications and use a network 118 to access those applications at cloud provider computing system 102. In the example shown in FIG. 1, the tenants are using ISPs 114-116, as also indicated by block 202 in the flow diagram of FIG. 3. The tenant computing systems 104-112 can use other architecture configurations as well, as indicated by block 204. The plurality of tenants 104-112 can run different applications and access those applications through a network in other ways as well, as indicated by block 206.

At some point, trigger detector 146 in congestion control system 138 detects a network traffic trigger indicating that congestion control system 138 should determine whether any of the network links in network 118 are congested. Detecting the network traffic trigger is indicated by block 208 in the flow diagram of FIG. 3. In one example, the trigger may be a time-based trigger in which case congestion control system 136 monitors for network congestion in a periodic way or in an otherwise time-based way, as indicated by block 210. In another example, trigger detector 146 can detect a trigger when the network traffic has suddenly spiked or increased beyond a threshold level, as indicated by block 212 in the flow diagram of FIG. 3. The network traffic trigger can be detected using other trigger criteria as well, as indicated by block 214.

Once triggered, usage level detector 148 detects the bandwidth usage level on different network links in network 118, as indicated by block 216. The usage level detector 148 can poll the different processors or servers 130, or the ISPs 114-116 or other components, to identify the number or volume of saturation or throttling events that have occurred on the network, as indicated by block 218. The bandwidth usage level can be detected on the level of ISP subnets, as indicated by block 220. The bandwidth usage level can be detected by aggregating the bandwidth usage level from multiple tenants given the ISP peering information 160 and tenant information 162 and using the data center mapping information as indicated by block 222. The bandwidth usage level on different network links can be detected in other ways as well, as indicated by block 224.

Congested link identifier 150 then identifies whether any of the links are carrying sufficient network bandwidth to be considered congested as indicated by block 226 in the flow diagram of FIG. 3. A network link may be considered congested, or saturated, if it is at a bandwidth usage level that meets a threshold level relative to its maximum capacity. For instance, assume that a network link is carrying 85% of its maximum capacity of network traffic. In that case, congested link identifier 150 may determine that the link is congested. Comparing the level of traffic usage carried by a network link to its maximum capacity is just one way of determining whether the link is congested, and is indicated by block 228. In another example, the congested link identifier 150 may identify the latency with which requests are being serviced and determine that a link is congested based upon that latency value, as indicated by block 230.

Determining whether a link is congested may be based on other congestion metrics or other criteria as well, as indicated by block 232.

For each congested link, contributing application identifier 152 identifies which applications are contributing to that congestion. Identifying applications contributing to the congestion on each congested link is indicated by block 234 in the flow diagram of FIG. 3. The particular applications may be identified by IP range identifier 168 based upon the IP address ranges from which the network traffic originates, as indicated by block 236. The particular applications may also be identified by the port identifier 170 based upon the ports being used by the network traffic, as indicated by block 238. The particular applications contributing to congestion may be identified in other ways as well, as indicated by block 240.

Once the applications contributing to the congestion are identified, then the applications for which throttling is warranted (high usage applications) are identified. That is, of the applications using the congested link, application-specific usage level processor 174 identifies which are contributing the most to the congestion. For instance, there may be many different applications using a congested link. However, it may be that only a small number of those applications are the applications which are significantly contributing to the congestion on the link. Therefore, application-specific usage level processor 174 identifies how much congestion each application (that is using the congested link) is contributing to the congestion. Those applications that are contributing a threshold amount to the network traffic may be identified as high usage applications. For instance, assume that a congested link is carrying 85% of its maximum network traffic. Assume also that an application is contributing 25% of the network traffic carried by that link. Assume further that a threshold has been set such that any application contributing more than 20% of the network traffic to a congested link will be identified as a high usage application. In that case, processor 174 compares the usage level of each application to the threshold, and the application that is contributing 25% of the network traffic to a congested link is identified as a high usage application and throttling is thus appropriate for that application.

In another example, instead of comparing the network traffic usage level of a particular application to a threshold value, the application is identified as a high usage application based upon its relative contribution to the overall network traffic being carried by the congested link. For instance, if the application is one of the top five applications in terms of the network traffic it is contributing to the congested link, then the application may be identified as a high usage application.

Determining whether throttling should be applied to an application is indicated by block 242 in the flow diagram of FIG. 3. Comparing the application-specific network usage level to a threshold level is indicated by block 244. Determining whether the application is a high usage application based upon the contribution by each application is indicated by block 246. The application can be identified as a high usage application in other ways as well, as indicated by block 248.

Application-specific factor adjustment identifier 176 then identifies, for each high usage application, what throttling operations are to be performed and what other factors in the application may be adjusted in order to reduce the bandwidth consumed by the application. Throttling signal generator 178 then generates a control signal that is provided to the application to perform application-specific throttling. Generating the control signal to apply application-specific throttling is indicated by block 250 in the flow diagram of FIG. 3. Identifying the throttling operation to be performed by the application is indicated by block 252. Identifying other factor adjustments that are to be made by the application is indicated by block 254. The throttling control signal can be generated in other ways as well, as indicated by block 256.

After the throttling control signal is provided to the application, and the application performs the throttling operation, then usage level detector 148 can again check the congestion on the congested link to see if the congestion has been adequately reduced. Performing throttling is indicated by block 258. Performing throttling for a desired time period is indicated by block 160. Of course, the throttling can be performed in other ways as well, as indicated by block 262.

Determining whether the congestion has been adequately reduced is indicated by block 264. Once congestion has been adequately reduced, then throttling signal generator 178 generates a control signal to the high usage application indicating that the throttling operation can be stopped, as indicated by block 265. If usage level detector 148 has determined at block 264 that the congestion has not yet been adequately reduced, then a signal indicative of this can be provided to application-specific factor adjustment identifier 176. Application-specific factor adjustment identifier 176 can then identify a more aggressive throttling operation or mechanism that is to be used and throttling signal generator 178 generates a control signal to the high usage (and other) applications indicating that the application should implement the more aggressive throttling operations, as indicated by block 266.

Until the operation is complete, as indicated by block 268, processing reverts to block 208 where trigger detector 146 detects another trigger indicating that it is time to check for congested links in the network 118 and to perform application-specific congestion, where throttling has been identified.

It can thus be seen that the present description proceeds with respect to a system that identifies congested links in a network in a computing system architecture. For each congested link, the present system identifies specific applications that are significantly contributing to that congestion. For those applications, a control signal is generated indicating that the applications are to perform application-specific throttling to reduce the amount of network bandwidth that the applications are consuming. In case the throttling operation does not adequately reduce the network bandwidth being consumed by the application, a more aggressive throttling operation can be implemented as well.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface displays (UI) have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

The above discussion has discussed a cloud provider computing system 102. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

Figure 4:
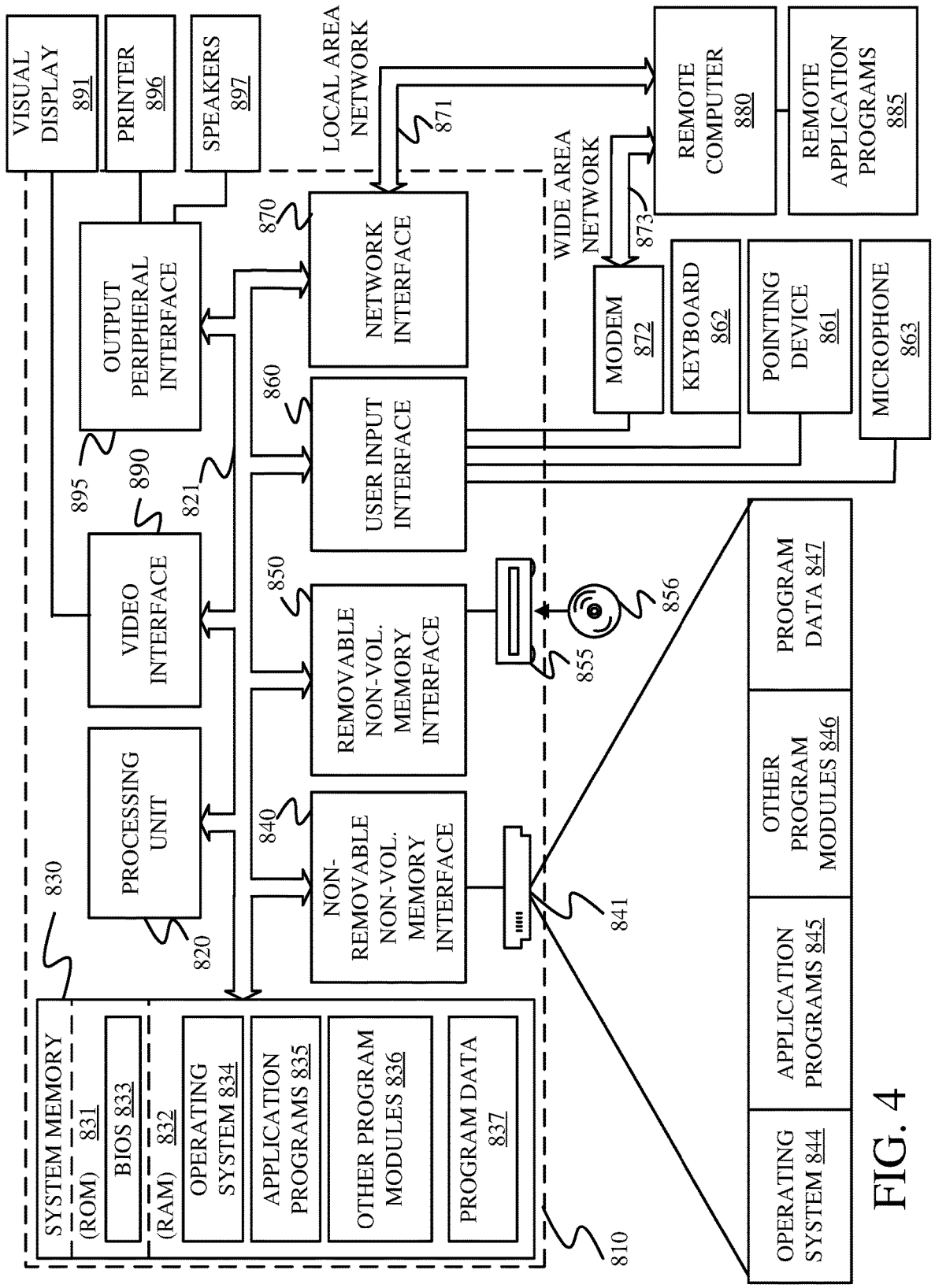
FIG. 4 is a block diagram showing one example of a computing system environment.

FIG. 4 is one example of a computing environment in which architecture 100, or parts of it, (for example) can be deployed. With reference to FIG. 4, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 4.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 4 illustrates operating system 834, application programs 835, other program modules 836, and program data 837.

The computer 810 may also include other removable/non-removable volatile/nonvolatile computer storage media. By way of example only, FIG. 4 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 4, provide storage of computer readable instructions, data structures, program modules and other data for the computer 810. In FIG. 4, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 4 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 4 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computer system, comprising:
at least one processor;
a data store that stores computer executable instructions which, when executed by the at least one processor, causes the at least one processor to perform steps, comprising:
identifying, as a congested network link between a first computing system and a cloud service provider in a wide area network, a network link carrying network traffic that is at a threshold traffic level;
detecting, as a contributing application, an application hosted by the cloud provider that is accountable for a threshold amount of the network traffic on the congested network link;
generating an application-specific throttle control signal controlling the contributing application to implement a first application-specific throttling operation to reduce network traffic attributable to the contributing application;
determining whether the congested network link is still carrying the threshold level of network traffic; and
if so, generating the application-specific throttle control signal to control the contributing application to implement a second application-specific throttling operation to reduce network traffic attributable to the contributing application.

Example 2 is the computer system of any or all previous examples wherein if the congested network link is not still carrying the threshold level of network traffic, the steps further comprise:
generating the application-specific throttle control signal to control the contributing application to stop implementing the first application-specific throttling operation.

Example 3 is the computer system of any or all previous examples wherein the second application-specific throttling operation is configured to reduce network traffic more than the first application-specific throttling operation.

Example 4 is the computer system of any or all previous examples wherein the first application-specific throttling operation comprises:
modifying application settings in the contributing application.

Example 5 is the computer system of any or all previous examples wherein the first application-specific throttling operation comprises:
  reducing a buffer size available for the contributing application to send and receive data in performing an operation.

Example 6 is the computer system of any or all previous examples wherein identifying a congested network link comprises:
  detecting a traffic congestion value indicative of network traffic congestion on a network link between a first computing system and a cloud service provider in a wide area network.

Example 7 is the computer system of any or all previous examples wherein identifying a congested network link comprises:
  comparing the traffic congestion value to a threshold traffic congestion value; and
  identifying the network link as the congested link based on the comparison of the traffic congestion value to the threshold traffic congestion value.

Example 8 is the computer system of any or all previous examples wherein detecting, as the contributing application, the application hosted by the cloud provider that is accountable for the threshold amount of the network traffic on the congested network link comprises:
  identifying an internet protocol (IP) address range corresponding to requests comprising the network traffic.

Example 9 is the computer system of any or all previous examples wherein detecting, as the contributing application, the application hosted by the cloud provider that is accountable for the threshold amount of the network traffic on the congested network link comprises:
  identifying a port corresponding to requests comprising the network traffic.

Example 10 is a computer implemented method, comprising:
  identifying, as a congested network link between a first computing system and a cloud service provider in a wide area network, a network link carrying network traffic that is at a threshold traffic level;
  detecting, as a contributing application, an application hosted by the cloud provider that is accountable for a threshold amount of the network traffic on the congested network link;
  generating an application-specific throttle control signal controlling the contributing application to implement a first application-specific throttling operation to reduce network traffic attributable to the contributing application;
  determining whether the congested network link is still carrying the threshold level of network traffic; and
  if so, generating the application-specific throttle control signal to control the contributing application to implement a second application-specific throttling operation to reduce network traffic attributable to the contributing application.

Example 11 is the computer implemented method of any or all previous examples wherein if the congested network link is not still carrying the threshold level of network traffic, then further comprising:
  generating the application-specific throttle control signal to control the contributing application to stop implementing the first application-specific throttling operation.

Example 12 is the computer implemented method of any or all previous examples wherein the second application-specific throttling operation is configured to reduce network traffic more than the first application-specific throttling operation.

Example 13 is the computer implemented method of any or all previous examples wherein generating the application-specific throttle control signal to control the contributing application to implement a first application-specific throttling operation comprises:
  generating the application-specific throttle control signal to control the contributing application to modify application settings in the contributing application.

Example 14 is the computer implemented method of any or all previous examples wherein generating the application-specific throttle control signal to control the contributing application to implement a first application-specific throttling operation comprises:
  generating the application-specific throttle control signal to control the contributing application to reduce a buffer size available for the contributing application to send and receive data in performing an operation.

Example 15 is the computer implemented method of any or all previous examples wherein identifying a congested network link comprises:
  detecting a traffic congestion value indicative of network traffic congestion on a network link between a first computing system and a cloud service provider in a wide area network.

Example 16 is the computer implemented method of any or all previous examples wherein identifying a congested network link comprises:
  comparing the traffic congestion value to a threshold traffic congestion value; and
  identifying the network link as the congested link based on the comparison of the traffic congestion value to the threshold traffic congestion value.

Example 17 is the computer implemented method of any or all previous examples wherein detecting, as the contributing application, the application hosted by the cloud provider that is accountable for the threshold amount of the network traffic on the congested network link comprises:
  identifying an internet protocol (IP) address range corresponding to requests comprising the network traffic.

Example 18 is the computer implemented method of any or all previous examples wherein detecting, as the contributing application, the application hosted by the cloud provider that is accountable for the threshold amount of the network traffic on the congested network link comprises:
  identifying a port corresponding to requests comprising the network traffic.

Example 19 is a computer implemented method, comprising:
  identifying, as a congested network link between a first computing system and a cloud service provider in a wide area network, a network link carrying network traffic that is at a threshold traffic level;
  detecting, as a contributing application, an application hosted by the cloud provider that is accountable for a threshold amount of the network traffic on the congested network link;
  generating an application-specific throttle control signal controlling the contributing application to implement a first application-specific throttling operation to reduce network traffic attributable to the contributing application;
  determining whether the congested network link is still carrying the threshold level of network traffic;

if so, generating the application-specific throttle control signal to control the contributing application to implement a second application-specific throttling operation to reduce network traffic attributable to the contributing application, the second application-specific throttling operation being configured to reduce network traffic more than the first application-specific throttling operation; and if the congested network link is not still carrying the threshold level of network traffic, then generating the application-specific throttle control signal to control the contributing application to stop implementing the first application-specific throttling operation.

Example 20 is the computer implemented method of any or all previous examples wherein generating the application-specific throttle control signal to control the contributing application to implement a first application-specific throttling operation comprises:

generating the application-specific throttle control signal to control the contributing application to modify application settings in the contributing application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:
    at least one processor; and
    a data store that stores computer executable instructions which, when executed by the at least one processor, causes the at least one processor to perform steps, comprising:
        identifying, as a congested network link between a first computing system and a cloud service provider in a wide area network, a network link carrying network traffic that is at a threshold traffic level;
        identifying, for each given application of a plurality of applications hosted by the cloud service provider that use the congested network link, an application-specific usage level that identifies how much congestion the given application is contributing to the network traffic on the congested network link;
        identifying at least one application, of the plurality of applications, as a contributing application that is accountable for a threshold amount of the network traffic on the congested network link based on the application-specific usage level identified for each given application of the plurality of applications;
        generating an application-specific throttle control signal controlling the contributing application to implement a first application-specific throttling operation to reduce network traffic attributable to the contributing application;
        determining whether the congested network link is still carrying the threshold traffic level of network traffic; and
        selectively performing one of:
            controlling the contributing application to stop implementing the first application-specific throttling operation based on determining the congested network link is not still carrying the threshold traffic level of network traffic, or
            controlling the contributing application to implement a second application-specific throttling operation to reduce network traffic attributable to the contributing application based on determining that the congested network link is still carrying the threshold traffic level of network traffic.

2. The computer system of claim 1 wherein the second application-specific throttling operation is configured to reduce network traffic more than the first application-specific throttling operation.

3. The computer system of claim 1 wherein the first application-specific throttling operation comprises:
    modifying application settings in the contributing application.

4. The computer system of claim 3 wherein the first application-specific throttling operation comprises:
    reducing a buffer size available for the contributing application to send and receive data in performing an operation.

5. The computer system of claim 1 wherein identifying a congested network link comprises:
    detecting a traffic congestion value indicative of network traffic congestion on a network link between a first computing system and a cloud service provider in a wide area network.

6. The computer system of claim 5 wherein identifying a congested network link comprises:
    comparing the traffic congestion value to a threshold traffic congestion value; and
    identifying the network link as the congested network link based on the comparison of the traffic congestion value to the threshold traffic congestion value.

7. The computer system of claim 1 wherein detecting, as the contributing application, the at least one application hosted by the cloud service provider that is accountable for the threshold amount of the network traffic on the congested network link comprises:
    identifying an internet protocol (IP) address range corresponding to requests comprising the network traffic.

8. The computer system of claim 1 wherein detecting, as the contributing application, the at least one application hosted by the cloud service provider that is accountable for the threshold amount of the network traffic on the congested network link comprises:
    identifying a port corresponding to requests comprising the network traffic.

9. A computer implemented method, comprising:
    identifying, as a congested network link between a first computing system and a cloud service provider in a wide area network, a network link carrying network traffic that is at a threshold traffic level;
    identifying, for each given application of a plurality of applications hosted by the cloud service provider that use the congested network link, an application-specific usage level that identifies how much congestion the given application is contributing to the network traffic on the congested network link;
    identifying at least one application, of the plurality of applications, as a contributing application that is accountable for a threshold amount of the network traffic on the congested network link; and
    generating an application-specific throttle control signal controlling the contributing application to implement an application-specific throttling operation to reduce network traffic attributable to the contributing application.

10. The computer implemented method of claim 9 wherein the application-specific throttling operation comprises a first application-specific throttling operation, and further comprising:

based on determining that the congested network link is still carrying the threshold traffic level of network traffic, controlling the contributing application to implement a second application-specific throttling operation to reduce network traffic attributable to the contributing application.

11. The computer implemented method of claim 10, wherein the second application-specific throttling operation is configured to reduce network traffic more than the first application-specific throttling operation.

12. The computer implemented method of claim 9 wherein generating the application-specific throttle control signal to control the contributing application to implement the application-specific throttling operation comprises:

generating the application-specific throttle control signal to control the contributing application to modify application settings in the contributing application.

13. The computer implemented method of claim 12 wherein generating the application-specific throttle control signal to control the contributing application to implement the application-specific throttling operation comprises:

generating the application-specific throttle control signal to control the contributing application to reduce a buffer size available for the contributing application to send and receive data in performing an operation.

14. The computer implemented method of claim 9 wherein identifying a congested network link comprises:

detecting a traffic congestion value indicative of network traffic congestion on a network link between a first computing system and a cloud service provider in a wide area network.

15. The computer implemented method of claim 14 wherein identifying a congested network link comprises:

comparing the traffic congestion value to a threshold traffic congestion value; and identifying the network link as the congested network link based on the comparison of the traffic congestion value to the threshold traffic congestion value.

16. The computer implemented method of claim 9 wherein detecting, as the contributing application, the at least one application hosted by the cloud service provider that is accountable for the threshold amount of the network traffic on the congested network link comprises:

identifying an internet protocol (IP) address range corresponding to requests comprising the network traffic.

17. The computer implemented method of claim 9 wherein detecting, as the contributing application, the at least one application hosted by the cloud service provider that is accountable for the threshold amount of the network traffic on the congested network link comprises:

identifying a port corresponding to requests comprising the network traffic.

18. The computer implemented method of claim 9, and further comprising:

based on determining the congested network link is not still carrying the threshold traffic level of network traffic, controlling the contributing application to stop implementing the application-specific throttling operation.

19. A computer implemented method, comprising:

identifying, as a congested network link between a first computing system and a cloud service provider in a wide area network, a network link carrying network traffic that is at a threshold traffic level;

detecting, as a contributing application, an application hosted by the cloud service provider that is accountable for a threshold amount of the network traffic on the congested network link; and generating an application-specific throttle control signal controlling the contributing application to implement an application-specific throttling operation to reduce network traffic attributable to the contributing application by reducing a buffer size available for the contributing application to send and receive data in performing an operation.

20. The computer implemented method of claim 19, wherein the application-specific throttling operation comprises a first application-specific throttling operation, and further comprising:

determining whether the congested network link is still carrying the threshold traffic level of network traffic; and selectively performing one of:

controlling the contributing application to implement a second application-specific throttling operation to reduce network traffic attributable to the contributing application based on determining that the congested network link is still carrying the threshold traffic level of network traffic, the second application-specific throttling operation configured to reduce network traffic more than the first application-specific throttling operation, or controlling the contributing application to stop implementing the first application-specific throttling operation based on determining the congested network link is not still carrying the threshold traffic level of network traffic.

* * * * *